(12) United States Patent
Deyle (10) Patent No.: US 10,251,159 B1
(45) Date of Patent: *Apr. 2, 2019

(54) REMOTE STORAGE OVER BACKSCATTER RADIO

(71) Applicant: X Development LLC, Mountain View, CA (US)

(72) Inventor: Travis Deyle, San Jose, CA (US)

(73) Assignee: X Development LLC, Mountain View, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/447,270

(22) Filed: Jul. 30, 2014

(51) Int. Cl.
*H04B 1/16* (2006.01)
*H04B 5/00* (2006.01)
(Continued)

(52) U.S. Cl.
CPC ...... *H04W 72/04* (2013.01); *G06F 17/30106* (2013.01); *H04B 5/00* (2013.01);
(Continued)

(58) Field of Classification Search
CPC ...... E21B 17/003; E21B 17/028; E21B 47/00; E21B 47/122; E21B 47/123; G01K 1/024; G01K 1/026; G01D 21/00; G01V 11/002; G04C 10/04; G04G 5/00; G08B 13/122; G06K 7/0008; G06K 19/0723; G06K 19/07749; G07C 9/00111; G08C 15/06; G06F 17/30106; H03C 7/02; H04B 1/16; H04B 1/28; H04B 1/3805; H04B 1/40; H04B 5/0012; H04B 5/02; H04B 1/3877; H04B 5/0031; H04B 5/0062; H04B 7/0413; H04B 17/318; H04L 27/3455; H04L 27/38; H04M 1/7253; H04W 52/24;
(Continued)

(56) References Cited

U.S. PATENT DOCUMENTS 6,434,372 B1 * 8/2002 Neagley ............... G01S 13/756
340/10.4
7,505,751 B1 * 3/2009 Backes ................. H04W 84/18
370/338
(Continued)

OTHER PUBLICATIONS

Liu, V. et al., "Ambient Backscatter: Wireless Communication Out of Thin Air", University of Washington, http://abc.cs.washington.edu/files/comm153-liu.pdf, Last accessed Jun. 27, 2014, 13 pages.
(Continued)

*Primary Examiner* — Yuwen Pan
*Assistant Examiner* — Paul P Tran
(74) *Attorney, Agent, or Firm* — Christensen O'Connor Johnson Kindness PLLC (57) ABSTRACT

A method of remotely storing data includes wirelessly pairing a mobile device to a base station, querying a file system of the mobile device to identify candidate data stored on the mobile device for remote storage, receiving electromagnetic ("EM") radiation incident upon a mobile device from the base station, modulating a radar cross-section of the mobile device between two or more states, encoding the candidate data onto a backscatter channel of the EM radiation via the modulation of the radar cross-section, and transmitting the candidate data to the base station over the backscatter channel for remote storage.

18 Claims, 6 Drawing Sheets

(51) Int. Cl.
*G06F 17/30* (2006.01)
*H04W 72/04* (2009.01)
*G06K 7/00* (2006.01)
*G06K 19/07* (2006.01)
*H04W 84/18* (2009.01)
*H04W 88/06* (2009.01)

(52) U.S. Cl.
CPC ....... *G06K 7/0008* (2013.01); *G06K 19/0723* (2013.01); *H04B 1/16* (2013.01); *H04W 84/18* (2013.01); *H04W 88/06* (2013.01)

(58) Field of Classification Search
CPC ............. H04W 52/245; H04W 52/281; H04W 72/042; H04W 72/044; H04W 72/04; H04W 76/02; H04W 84/08; H04W 84/18; H04W 88/06; H04W 88/08; H04W 4/008; H04W 8/005; H04W 28/04; H02J 5/005; H02J 11/00
USPC ........ 340/1.1, 10.1, 10.5, 854.6, 854.8, 567; 342/42, 51; 381/77, 79; 455/41.1, 41.2, 455/88, 106
See application file for complete search history.

(56) References Cited

U.S. PATENT DOCUMENTS

| | | | |
|---|---|---|---|
| 7,657,227 B2 | 2/2010 | Doan et al. | |
| 8,519,847 B2* | 8/2013 | Honkanen | G06K 7/0008 340/3.2 |
| 8,528,825 B2 | 9/2013 | Batra | |
| 9,693,224 B2* | 6/2017 | Teuwen | H04W 12/04 |
| 2003/0104848 A1* | 6/2003 | Brideglall | G06K 7/0008 455/574 |
| 2005/0225433 A1* | 10/2005 | Diorio | G06K 19/0726 340/10.4 |
| 2005/0248438 A1* | 11/2005 | Hughes | G06K 19/0717 340/10.4 |
| 2007/0243851 A1* | 10/2007 | Shoarinejad | H04W 52/288 455/343.2 |
| 2009/0201134 A1* | 8/2009 | Rofougaran | G06K 19/0723 340/10.1 |
| 2010/0231382 A1* | 9/2010 | Tayrani | G01D 21/00 340/539.27 |
| 2011/0133890 A1* | 6/2011 | Duron | G06K 7/0008 340/10.1 |
| 2013/0176115 A1 | 7/2013 | Puleston et al. | |
| 2013/0234829 A1* | 9/2013 | Jeon | H04B 5/0062 340/10.1 |
| 2014/0062664 A1* | 3/2014 | Gudan | G06K 7/10207 340/10.1 |
| 2014/0113561 A1* | 4/2014 | Maguire | H04B 5/0037 455/41.2 |
| 2014/0133530 A1 | 5/2014 | Maguire | |
| 2014/0306805 A1* | 10/2014 | Jung | G06K 19/0723 340/10.1 |
| 2015/0229133 A1* | 8/2015 | Reynolds | H04W 52/281 307/24 |

OTHER PUBLICATIONS

Thomas, S. et al., "QAM Backscatter for Passive UHF RFID Tags", 4th IEEE International Conference on RFID (RFID), Apr. 2010, 5 pages.

Thomas, S. et al., "A 96 Mbit/sec, 15.5 pJ/bit 16-QAM Modulator for UHF Backscatter Communication", 6th IEEE International Conference on RFID (RFID), Apr. 2012, 6 pages.

Thomas, S. et al., "Quadrature Amplitude Modulated Backscatter in Passive and Semi-Passive UHF RFID Systems", IEEE Transactions on Microwave Theory and Techniques, vol. 60, Issue 4, Apr. 2012, 8 pages.

Thomas, S. et al., "Rich-Media Tags: Battery-Free Wireless Multichannel Digital Audio and Image Transmission with UHF RFID Techniques", 7th IEEE International Conference on RFID (RFID), Apr. 30, 2013, 6 pages.

Besnoff, J.S. et al., "Battery-Free Multichannel Digital ECG Biotelemetry using UHF RFID Techniques", 7th IEEE International Conference on RFID (RFID), Date of Conference: Apr. 30, 2013-May 2, 2013, 7 pages.

Thomas, S., "Modulated Backscatter for Low-Power High-Bandwidth Communication", Department of Electrical and Computer Engineering Duke University, May 2013, 208 pages.

Sample, A.P. et al. "Design of an RFID-Based Battery-Free Programmable Sensing Platform", IEEE Transactions on Instrumentation and Measurement, vol. 57, No. 11, Nov. 2008, 8 pages.

Miller, G., "Scientists Put Backpacks on Dragonflies to Track Their Brains in Flight", Wired Magazine, Jun. 2013, http://www.wired.com/2013/06/dragonfly-backpack-neuron/, 3 pages.

* cited by examiner

REMOTE STORAGE OVER BACKSCATTER RADIO

TECHNICAL FIELD

This disclosure relates generally to remote storage, and in particular, but not exclusively, relates to remote storage for mobile devices.

BACKGROUND INFORMATION

Remote backup (often referred to as cloud backup or cloud storage) is a service that enables a user to backup or otherwise store/share data over a network to a remotely coupled device. Cloud storage is a model of data storage where data can be stored in logical pools while the physical storage spans across multiple servers, and often multiple locations. The physical environment is typically owned and managed by a hosting company. Often a client-side program runs on the client device and manages a backup schedule, which may be periodic or on-demand. Cloud storage services are typically accessed by client devices with network connections to the Internet.

Currently, the only realistic way to transfer data (e.g., large media files, etc.) off a mobile device is via a wired connection, a WiFi radio, a Bluetooth radio, or a cellular radio. The wired connection frustrates the portability feature of a mobile device, while WiFi, Bluetooth, and cellular radios are inherently power hungry, thereby limiting the duration of their use. These techniques are poor solutions for battery-constrained mobile devices, if the data is streamed for prolonged periods of time.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and methods of operation for remote storage over a backscatter radio are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
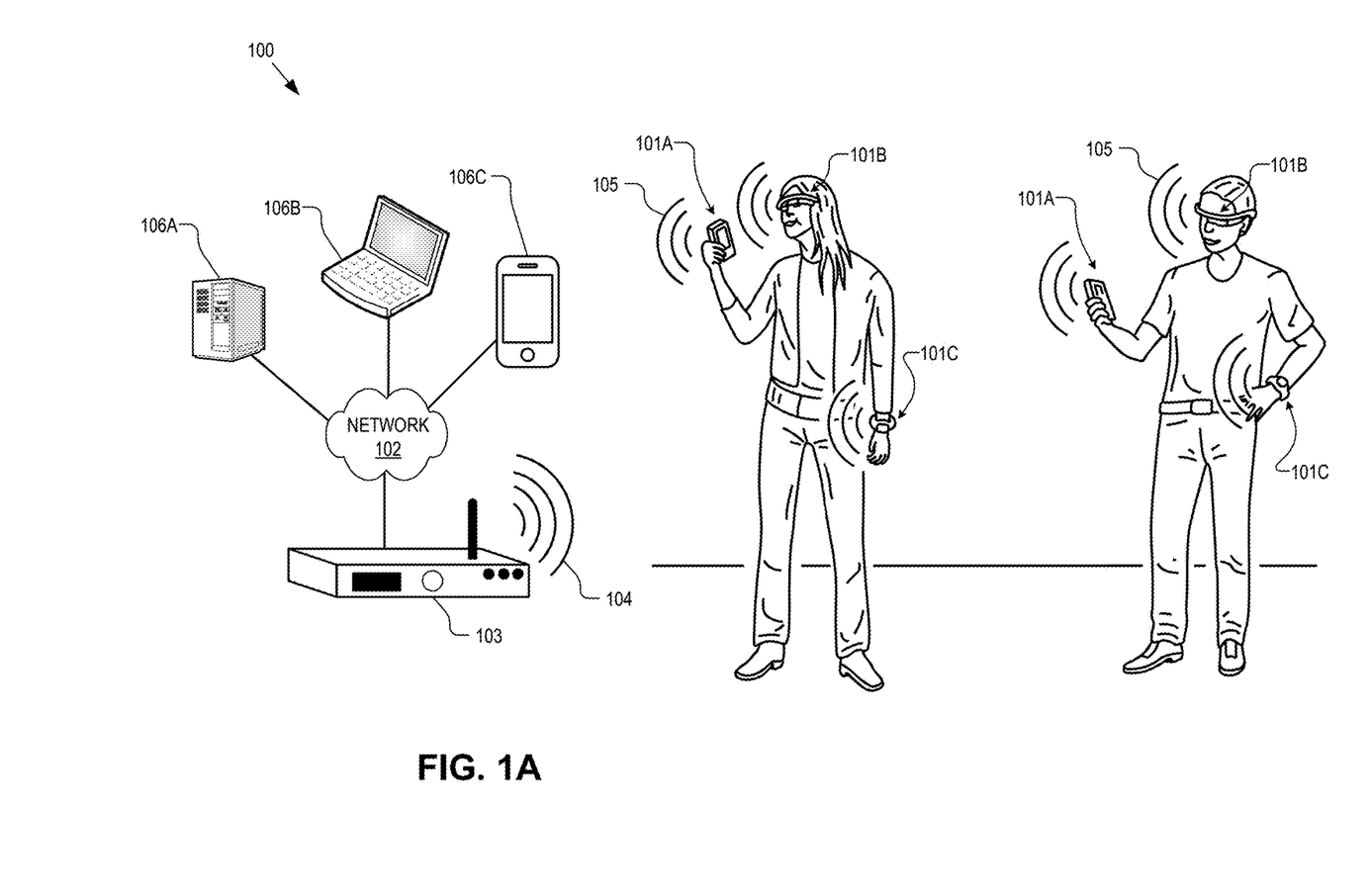
FIG. 1A illustrates an environment for remotely storing data from mobile devices over backscatter channels, in accordance with an embodiment of the disclosure.

FIG. 1A illustrates an environment 100 for remotely storing data from one or more mobile devices 101 to a remote location via a base station 103, in accordance with an embodiment of the disclosure. Environment 100 uses backscatter communications to provide a short range (e.g., up to 20 m), high bandwidth (e.g., 20 to 100 Mbps), and low power (e.g., less than 1 mW) wireless communication link to deliver data from mobile devices 101 to base station 103. The backscatter communication links described herein are well suited for transferring large media files such as video files, pictures, data files, real-time streaming, or otherwise. Base station 103 is coupled to remote devices 106 over a network 102 to transfer the data received over the backscatter communication links to remote devices 106. Network 102 may include a local area network ("LAN"), a wide area network ("WAN"), a metro area network ("MAN"), the Internet, or otherwise. Remote devices 106 may include a variety of remote storage options including a server 106A implementing a cloud-based storage service (e.g., Dropbox™, Photobucket™, iCloud™, Google Cloud Storage™, etc.) or a network attached storage ("NAS") solution, a remotely coupled computer 106B, a remotely coupled mobile storage device 106C (e.g., tablet, laptop, etc.), or otherwise.

The backscatter communication link is achieved by integrating backscatter tags (e.g., semi-passive RFID tags) into mobile devices 101. The design leverages asymmetric power budgets between wired base station 103 and mobile devices 101 to provide a low power solution on the mobile device side by relying upon the readily available power on the base station side.

Base station 103 includes one or more antennas that broadcast electromagnetic ("EM") radiation 104 towards mobile devices 101 and receive modulated backscatter reflections 105 of EM radiation 104. Modulated backscatter reflections 105 are referred to as the backscatter signal or backscatter channel. The backscatter tags integrated into mobile devices 101 do not transmit any RF or microwave power. Rather, they operate by modulating the reflections of EM radiation 104. The backscatter reflections are encoded with the data signals by modulating the radar signatures or radar cross-section of mobile devices 101 with data streams and base station 103 demodulates the received radar signatures reflected from mobile devices 101 to extract the embedded data. One technique for modulating the radar cross-section of mobile devices 101 is to modulate an impedance load coupled to the backscatter antenna on mobile device 101. This impedance modulation is a low power task when compared to an active transmitter such as WiFi, Bluetooth, or cellular radios. Since the backscatter tags are not actively transmitting, they are substantially unregulated, which makes them appealing in terms of changing technologies and are inherently backwards compatible as new standards or technologies arise. Most of the intelligence for operation of the backscatter channel can be embedded either in software on mobile devices 101 or in base station 103 and thus is readily updateable.

Conventional RFID tags are fully passive devices that include no independent power source and harvest their energy for operation from EM radiation 104. However, energy harvesting from EM radiation 104 effectively slows the data rate of the backscatter channel, since the backscatter antenna will typically be optimized for harvesting power, not improving the signal-to-noise ratio ("SNR") of the backscatter channel. Additionally, fully passive RFID tags often pause for periodic power harvesting, which interrupts or delays data transmission. Energy harvesting reduces the read range for base station 103 because more incident EM radiation 104 is required to power up a backscatter tag than is required for the backscatter communications alone. Conventional fully passive backscatter tags employ slower data rates, as energy consumption on the backscatter tag is highly dependent on clock speed.

Embodiments of the backscatter tags embedded within mobile devices 101 are partially passive devices, which do not harvest energy from EM radiation 104. Rather, the backscatter tags are powered by the main battery of mobile devices 101. Since modulating the impedance load requires a modest power budget (e.g., 15 uW), the backscatter transmission does not impact battery life in a significant manner. Additionally, by not harvesting power from EM radiation 104, the backscatter antennas and modulation load impedances can be optimized for reflecting EM radiation 104 to improve SNR, reduce bit rate errors, and increase data throughput of the backscatter channel. By not harvesting power from EM radiation 104 to power the backscatter tag, embodiments disclosed herein can operate with higher clock rates and greater data throughput.

The limiting factor, in terms of range and bandwidth, for conventional fully passive RFID tags is the need to harvest energy. This power harvesting requirement dictates the design (size and shape) of the backscatter antenna to ensure adequate energy can be absorbed. By moving to a partially passive design where modulation of the radar cross-section of the backscatter antenna is battery powered, significant flexibility in antenna design is provided on the mobile device side.

EM radiation 104 may be broadcast using a variety of different carrier frequencies. For example, EM radiation 104 may operate on unencumbered frequencies such as 915 MHz, 2.45 GHz, 5.8 GHz, and 61.25 GHz. The backscatter tags may modulate the backscatter signal using a variety of techniques and symbol constellations for encoding the data signal onto the backscatter channel. For example, binary phase shift keying ("BPSK") or binary amplitude shift keying ("BASK") may be used. To achieve higher data rates, quadrature amplitude modulation ("QAM") may be used to modulate the load impedances applied to the backscatter antenna. Using higher carrier frequencies and larger QAM constellations (e.g., 16-QAM, 64-QAM, etc.) can achieve higher data rates (e.g., 100 Mbps). In some embodiments, the symbol constellation for encoding the data signal on the backscatter channel can be adaptively updated based upon the environment (e.g., noise, multi-path reflections etc.) and based upon the particular backscatter antenna being used to improve throughput, improve SNR, or make the backscatter link less susceptible to degradation as a mobile device 101 moves through the environment.

Figure 1B:
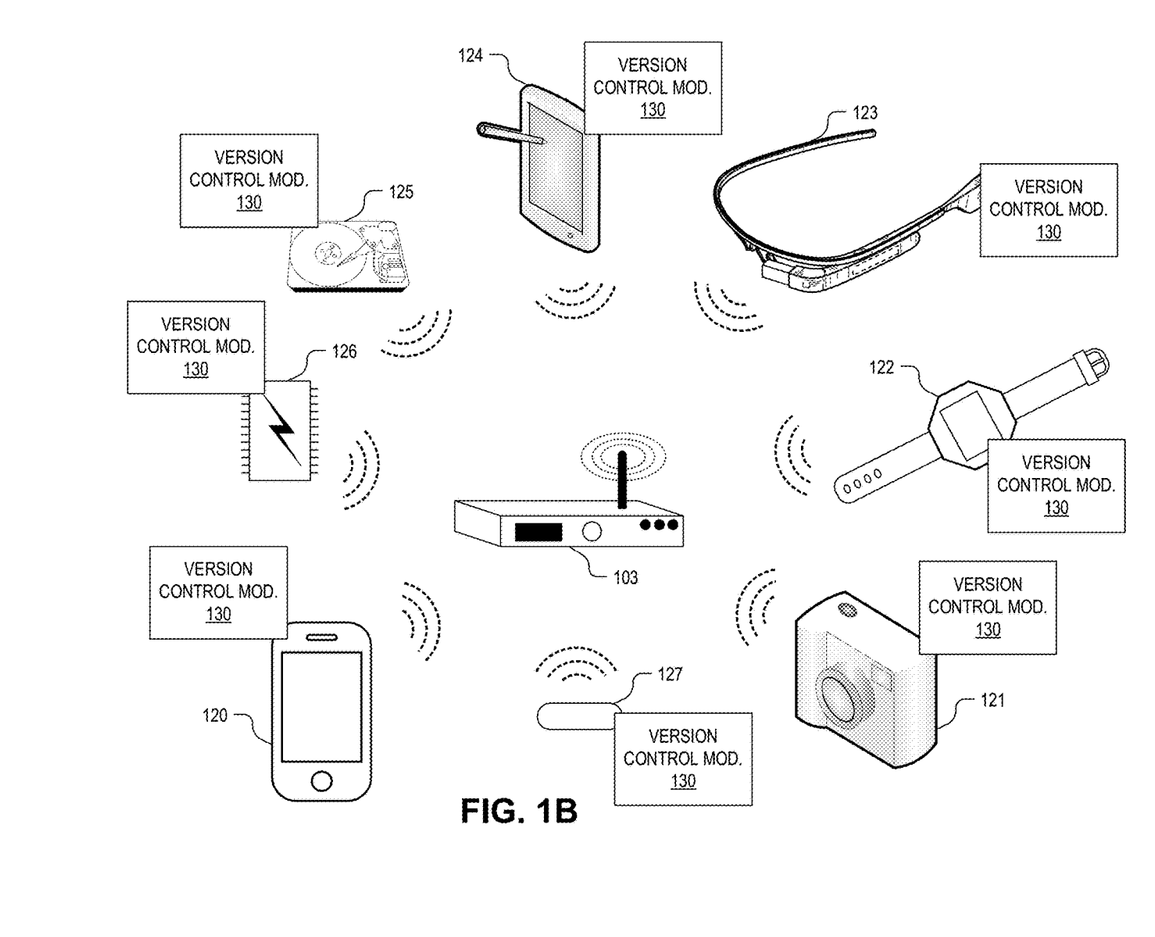
FIG. 1B illustrates the different type of mobile devices that can be adapted to remotely store data over backscatter channels, in accordance with embodiments of the disclosure.

Mobile devices 101 represent a variety of different devices, including mobile phones 101A, head wearable displays 101B, smart wrist watches 101C, tablets, laptops, body-mountable devices, body implantables, or other mobile devices operating with limited power budgets. Embodiments disclosed herein provide a backscatter channel having sufficient bandwidth to support high bandwidth data streams, such as a video streams, virtual desktops, or otherwise, from mobile devices 101 to base station 103. Base station 103 may be coupled to network 102 to backup or store the data to a remote location. In other embodiments, base station 103 may include an output display port for coupling to a screen or display terminal (e.g., a television in a user's home, a projection screen in a conference room, a computer monitor, or otherwise). In the illustrated embodiment, base station 103 is a standalone box; however, in other embodiments, base station 103 may be integrated into other consumer products, such as a set-top box, computer, a wireless router, a modem, or otherwise. In some use case scenarios, multiple base stations 103 can be distributed about a home, office space, or even public spaces (e.g., libraries, coffee shops, bus stations, stores, etc.) to provide remote storage "hot-spots" where mobile devices 101 can quickly remotely store (e.g., backup or offload) media files or other data to cloud-storage services.

FIG. 1B illustrates how base station 103 can be used to provide low power, high bandwidth remote storage capabilities to a variety of different mobile devices. These mobile devices may include a cellular phone 120, a camera 121, a watch 122, a head wearable display 123, a tablet 124, a portable hard disk 125, non-volatile memory devices 126 (e.g., a USB stick, a flash memory card, etc.), a body implantable 127, or otherwise. In one embodiment, each of these mobile devices includes a controller or micro-processor capable of running a version control module 130, which identifies candidate data on the mobile device for remote storage. Version control module 130 may be logic that is implemented in software/firmware, hardware, or a combination of both. Version control module 130 may perform a variety of different routines for identifying candidate data for remote storage, tracking changes in the candidate data, and remotely storing the candidate data. For example, in one embodiment, version control module 130 may implement functionality similar to the rsync utility of the Unix operating system. Of course, other algorithms for synchronizing (i.e., backing up) or offloading candidate data may be used.

Figure 2:
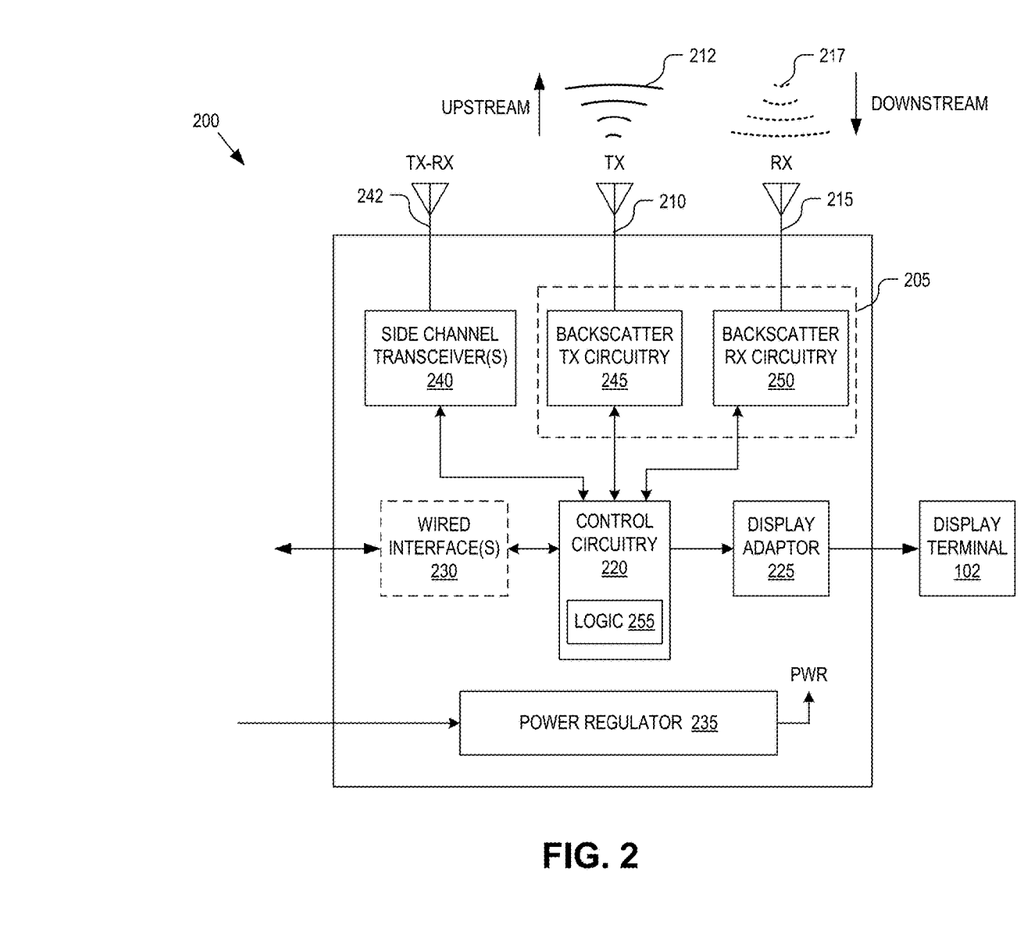
FIG. 2 is a functional block diagram illustrating a base station for wirelessly streaming data from a mobile device, in accordance with an embodiment of the disclosure.

FIG. 2 is a functional block diagram illustrating a base station 200 for remotely storing data from a mobile device, in accordance with an embodiment of the disclosure. Base station 200 is one possible implementation of base station 103 illustrated in FIGS. 1A and 1B. The illustrated embodiment of base station 200 includes a backscatter transceiver 205, backscatter antennas 210 and 215, control circuitry 220, a display adaptor 225, wired interface(s) 230, a power regulator 235, side channel transceiver(s) 240, and one or more side channel antenna(s) 242. The illustrated embodiment of backscatter transceiver 205 includes backscatter transmit circuitry 245 and backscatter receive circuitry 250. The illustrated embodiment of control circuitry 220 includes logic 255. FIG. 2 illustrates functional components of base station 200 and not necessarily structural layout. It should be appreciated that the various components of base station 200 may be implemented entirely in hardware, entirely in software/firmware, or using a hybrid of both software/firmware and hardware.

Backscatter transceiver 205 is the primary communication channel for delivering high bandwidth data streams from mobile devices 101 to base station 200. In one embodiment, the upstream direction from backscatter transmit circuitry 245 is a non-communicative path, but merely outputs EM radiation 212 as a sort of radar signal. In other embodiments, backscatter transmit circuitry 245 can modulate data onto EM radiation 212 to provide an upstream broadcast data path to mobile devices 101. For example, the upstream broadcast data path may be encoded with a beacon signal to notify mobile device of the presence of base station 200 in their vicinity. Backscatter transmit circuitry 245 can output EM radiation 212 having a variety of different frequencies such as 915 MHz, 2.45 GHz, 5.8 GHz, 61.25 GHz, or otherwise. Backscatter receive circuitry 250 implements the downstream path from mobile devices 101 and operates by demodulating the backscatter signal reflected by mobile devices 101. In essence, backscatter receive circuitry 250 is demodulating the received radar signature reflected from mobile devices 101. The radar signature or backscatter signal may be modulated using a variety of different techniques and symbol constellations including, BPSK, BASK, QAM or otherwise. As such, backscatter receive circuitry 250 includes the requisite filters, mixers, amplifiers, decoders, framers, and the like to demodulate/decode the appropriate modulation scheme. Although FIG. 2 illustrates separate transmit and receive antennas, in other embodiments, a single backscatter antenna may be used to both transmit EM radiation 212 and receive the backscatter signal 217. In yet another embodiment, multiple transmit and receive antennas may be used along with beam forming and tracking techniques.

Side channel transceiver(s) 240 represent one or more wireless communication channels that do not use backscatter communications. For example, side channel transceiver(s) 240 may be implemented using a WiFi transceiver, a Bluetooth transceiver, an infrared transceiver, or other standardized/proprietary wireless communication systems. Side channel transceiver 240 facilitates out-of-band communications with mobile devices 101. To conserve power, side channel transceiver 240 is well-suited for low bandwidth control signaling with mobile devices 101 to setup, teardown, or otherwise manage wireless communication sessions with mobile devices 101. The side channel transceiver 240 may also provide a network connection to the Internet or other consumer products (e.g., network attached storage, etc.) for base station 200.

Wired interface(s) 230 may include any number of wired communication ports. For example, wired interfaces 230 may include an Ethernet controller, a universal serial bus ("USB") port, or otherwise. The Ethernet controller may provide a network connection for connecting to network 102.

Display adaptor 225 includes video adaptor circuitry for outputting a screen image to a display terminal. The output port of display adaptor 225 may include an HDMI cable, a VGA connector, a S-video cable, a composite video cable, component video cable, or otherwise.

Power regulator 235 provides a wired power connection for powering the internal components of base station 200. Since base station 200 is a wired device, it is not constrained by a limited power budget like mobile devices 101. Backscatter communications leverage this asymmetric power budget by pushing the power hungry generation of EM radiation 212 into base station 200 while mobile devices 101 operate by reflecting EM radiation 212 (not independently generating radiation) generated at base station 200.

Control circuitry 220 is the operational brains of base station 200. It includes logic 255 for coordinating the operation of the other functional components and includes a processor for computational executions. Logic 255 may include hardware logic or software/firmware instructions stored on one or more memory devices. For example, logic 255 may include instructions for establishing a wireless communication session with one or more mobile devices 101, configuring and managing the wireless communication sessions, and terminating the wireless communication sessions. In one embodiment, logic 255 may include remote storage logic for retrieving candidate data from mobile devices 101 and transferring the candidate data to one or more remote devices such as remote devices 106.

Figure 3:
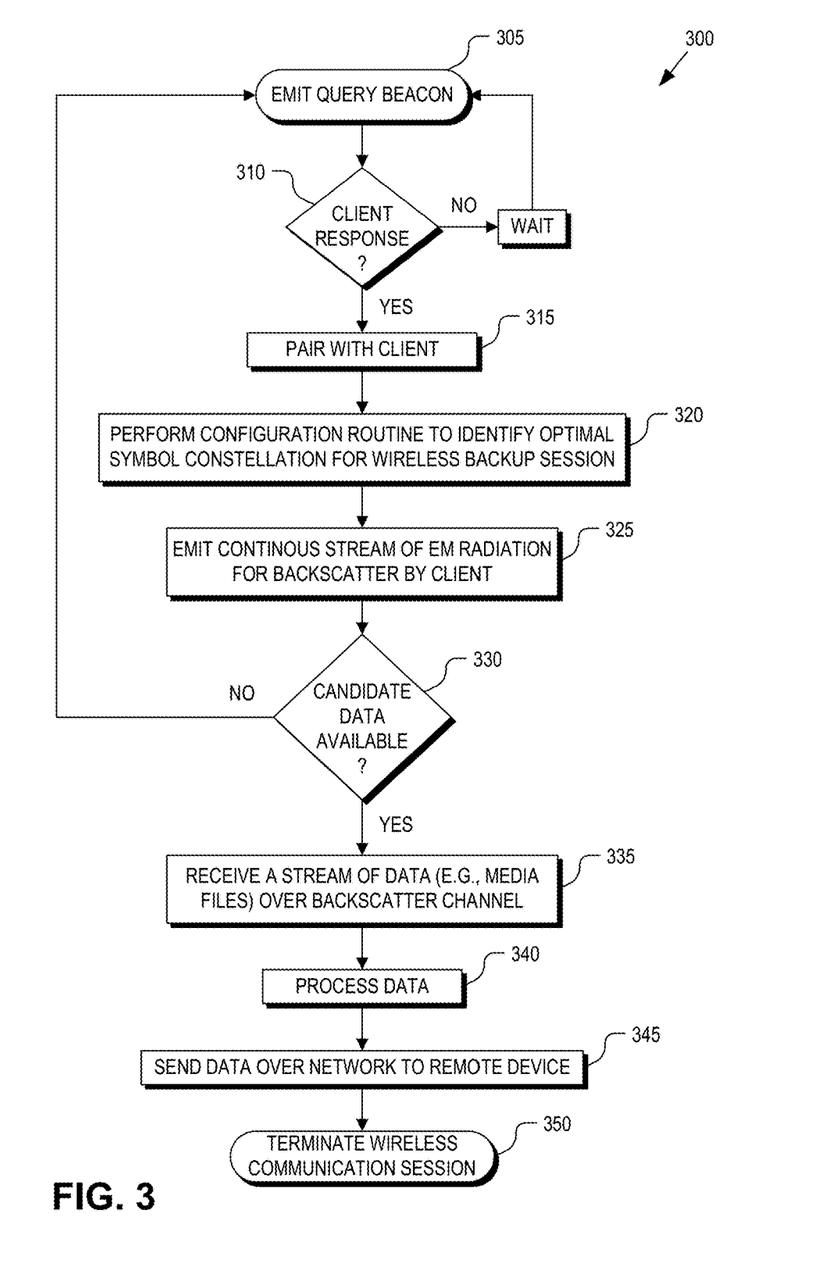
FIG. 3 is a flow chart illustrating base station side processing for wirelessly streaming data from a mobile device over a backscatter channel, in accordance with an embodiment of the disclosure.

FIG. 3 is a flow chart illustrating a process 300 performed by base station 200 for remotely storing data from mobile devices 101, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, base station 200 emits a beacon signal to alert mobile devices within its vicinity of its presence. In one embodiment, the beacon signal is encoded onto the EM radiation 104 and emitted as a periodic signal. In another embodiment, the beacon signal is broadcast over one of its side channel transceivers 240.

When a mobile device wanders into the vicinity of base station 200, it can respond to the beacon signal. The response may include side channel signaling or modulating the EM radiation using the backscatter channel. Upon receiving a client response from a mobile device (decision block 310), pairing between base station 200 and the mobile device 101 can commence (process block 315). In one embodiment, pairing includes establishing a wireless communication session between base station 200 and the mobile device 101. The control signaling used to establish a given wireless communication session may be conveyed over the out-of-band side channel using side channel transceivers 240 may be partially or entirely in-band over the backscatter channel. Establishing a wireless communication session may include one or more of assigning a session reference number, determining communication privileges, allocating memory for the streaming data, establishing a timeshare allocation, exchanging cryptographic keys, etc.

In a process block 320, base station 200 may perform a configuration routine in cooperation with the mobile device to identify an optimal symbol constellation for encoding the backscatter channel during the wireless communication session. This configuration routine may be part of establishing the wireless communication session. For example, the mobile device may encode a configuration data set with a series of different symbols while base station 200 analyzes the signal quality associated with the various different symbols. This configuration routine may continue until base station 200 identifies a preferred symbol constellation that maximize SNR or data throughput. The identified symbol constellation may then be used for the remainder of the wireless communication session, for a fixed period of time when the configuration routine is automatically re-executed, or until the signal quality drops below a threshold (e.g., threshold bit error rate). In one embodiment, the configuration routine is executed in cooperation with the side channel signaling to facilitate the processes. Execution of the configuration routine to dynamically select a symbol constellation for encoding data over the backscatter channel is optional. A fixed symbol constellation may also be used.

Once the wireless communication session has been commenced, base station 200 commences emitting a continuous stream of EM radiation 212 for modulation and backscatter by the mobile device (process block 325). In a timesharing embodiment, the continuous stream of EM radiation 212 may be continuous for fixed periods of time. Timesharing may include timesharing the backscatter channel between multiple backscatter devices or timesharing an antenna on a given mobile device 101 that is used for both backscatter communications and active emission communications with side channel transceivers 240, or otherwise.

In a decision block 330, if the mobile device has candidate data available for remote storage over the backscatter channel, then process 300 continues to a process block 335. In process block 335, base station 200 commences receiving data (e.g., media files, etc.) over the backscatter channel via backscatter signal 217 from the mobile device. In process block 340, base station 200 processes the received data. This may include compression, encryption, or otherwise in preparation for re-packetizing the data for transmission over network 102 to a remote device 106 (process block 345). The data may be output from base station 200 over wired interfaces 230 or side channel transceiver 240. In various embodiments, the data received from the mobile device may be stored remotely over a LAN, a WAN, a MAN, or the Internet to a remote device or server. In some cases, the data may be transmitted over the Internet to a cloud-based storage service.

Although not illustrated, various embodiments of base station 200 may include storage capacity in the form of a hard drive, volatile memory, or non-volatile memory (e.g., flash memory). This storage can provide temporary storage capacity when a persistent network connection is temporarily down. Alternatively, this storage could operate as the long-term remote storage for mobile devices 101 providing a consumer with an all-in-one solution for wireless, remote storage over a backscatter communication link. Cloud-based storage services could also be used to provide an offsite backup solution to the storage integrated into or directly coupled to base station 200.

Once receipt of the data has completed, base station 200 ceases the continuous output of EM radiation 212 and the wireless communication session is terminated (process block 350). In one embodiment, control signaling for terminating the wireless communication session may be executed out-of-band over side channels (e.g., Bluetooth or WiFi), or using a special in-band termination sequence that is recognized by base station 200.

Figure 4:
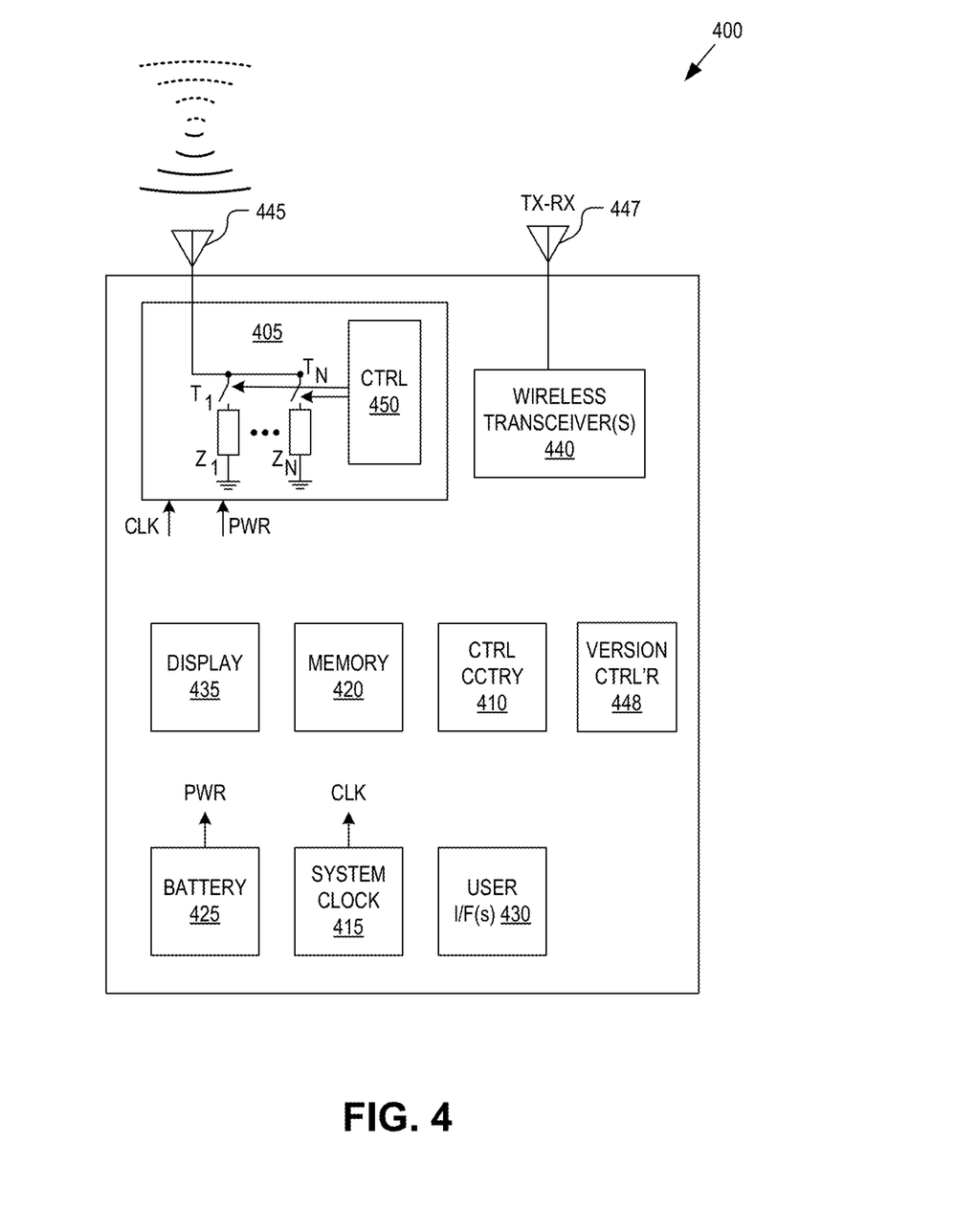
FIG. 4 is a functional block diagram illustrating a mobile device including a backscatter tag for wirelessly streaming data to a base station over a backscatter channel, in accordance with an embodiment of the disclosure.

FIG. 4 is a functional block diagram illustrating a mobile device 400 including a backscatter tag 405 for wirelessly streaming data to base station 103, in accordance with an embodiment of the disclosure. Mobile device 400 is one possible implementation of one of mobile devices 101 and may represent at mobile phone, a head wearable display, a wrist watch, a tablet, a laptop, a body wearable device, an implantable device, or otherwise. The illustrated embodiment of mobile device 400 includes backscatter tag 405, control circuitry 410, a system clock 415, memory 420, a battery 425, user interface(s) 430, a display 435, wireless transceiver(s) 440, antennas 445 and 447, and a version control module 448. The illustrated embodiment of backscatter tag 405 includes an adjustable load impedance module including load impedances Z1 to ZN and a backscatter controller 450.

Backscatter tag 405 is the primary communication channel for delivering high bandwidth data streams from mobile device 400 to base station 103. Backscatter tag 405 is a relatively inexpensive and small item that can be integrated into mobile devices 101. Backscatter tag 405 operates by modulating the radar cross-section of one or more elements (e.g., antenna 445) within mobile device 400 that can operate as a backscatter antenna. Antenna 445 need not be a dedicated backscatter antenna; rather, in some embodiments, backscatter tag 405 may share its antenna with wireless transceivers 440. Sharing an antenna can significantly eases the complexity of including an additional wireless transmitter into space constrained mobile devices, since existing antenna elements are reused. This is made possible by foregoing power harvesting and instead powering and clocking backscatter tag 405 using the primary system battery 425 and system clock 415.

In one embodiment, backscatter tag 405 operates to module the radar cross-section of antenna 445 by modulating a load impedance selectively coupled to the antenna element. In the illustrated embodiment, backscatter tag 405 modulates the load impedance of the coupled antenna by selectively coupling (e.g., via switches T1 to TN) load impedances Z1 to ZN to antenna 445 under the influence of backscatter controller 450. This switching of the load impedances is a relative small power operation and backscatter tag 405 does not generate any EM radiation of its own. Backscatter controller 450 operates by receiving a data stream input from control circuitry 410 and using the data stream input to modulate the impedances of the connected backscatter antenna 445. Various other techniques for modulating the radar cross section of mobile device 400 may also be implemented. For example, the adjustable load impedance module may include one or more variable impedance transistors, diodes with adjustable biases, or otherwise.

Wireless transceiver(s) 440 represent one or more wireless communication channels that do not use backscatter communications. For example, side wireless transceiver(s) 440 may be implemented using a WiFi transceiver, a Bluetooth transceiver, an infrared transceiver, a cellular transceiver, or other standardized/proprietary wireless communication systems. Wireless transceiver 440 facilitates out-of-band communications with base station 103. To conserve power, wireless transceiver(s) 440 are well-suited for low bandwidth control signaling with base station 103 to setup, teardown, or otherwise manage wireless communication sessions with mobile device 400. The wireless transceiver(s) 440 may also provide a network connection to the Internet or other consumer products (e.g., network attached storage, etc.).

As illustrated, mobile device 400 may include a variety of other functional elements for the regular operation of mobile device 400. These include control circuitry 410 (e.g., microprocessor), memory 420 (e.g., RAM and ROM), a display 435, and interface devices 430 (e.g., a touch screen, mechanical buttons, capacitive sense buttons, wired communication ports, etc.). Mobile device 400 includes a system clock 415 for synchronous operations and a battery 425 having a limited power budget. Other functional components of typical mobile devices may also be included, but are not illustrated so as not to clutter FIG. 4 and obscure the relevant details.

Control circuitry 410 is the operational brains of mobile device 400. It includes logic for coordinating the operation of the other functional components and includes a processor to perform computational executions. This logic may include hardware logic or software/firmware instructions stored on one or more memory devices. For example, the logic may include instructions for establishing a wireless communication session with base station 103, configuring and managing the wireless communication sessions, terminating the wireless communications sessions, execution of version control module 448, etc.

Figure 5:
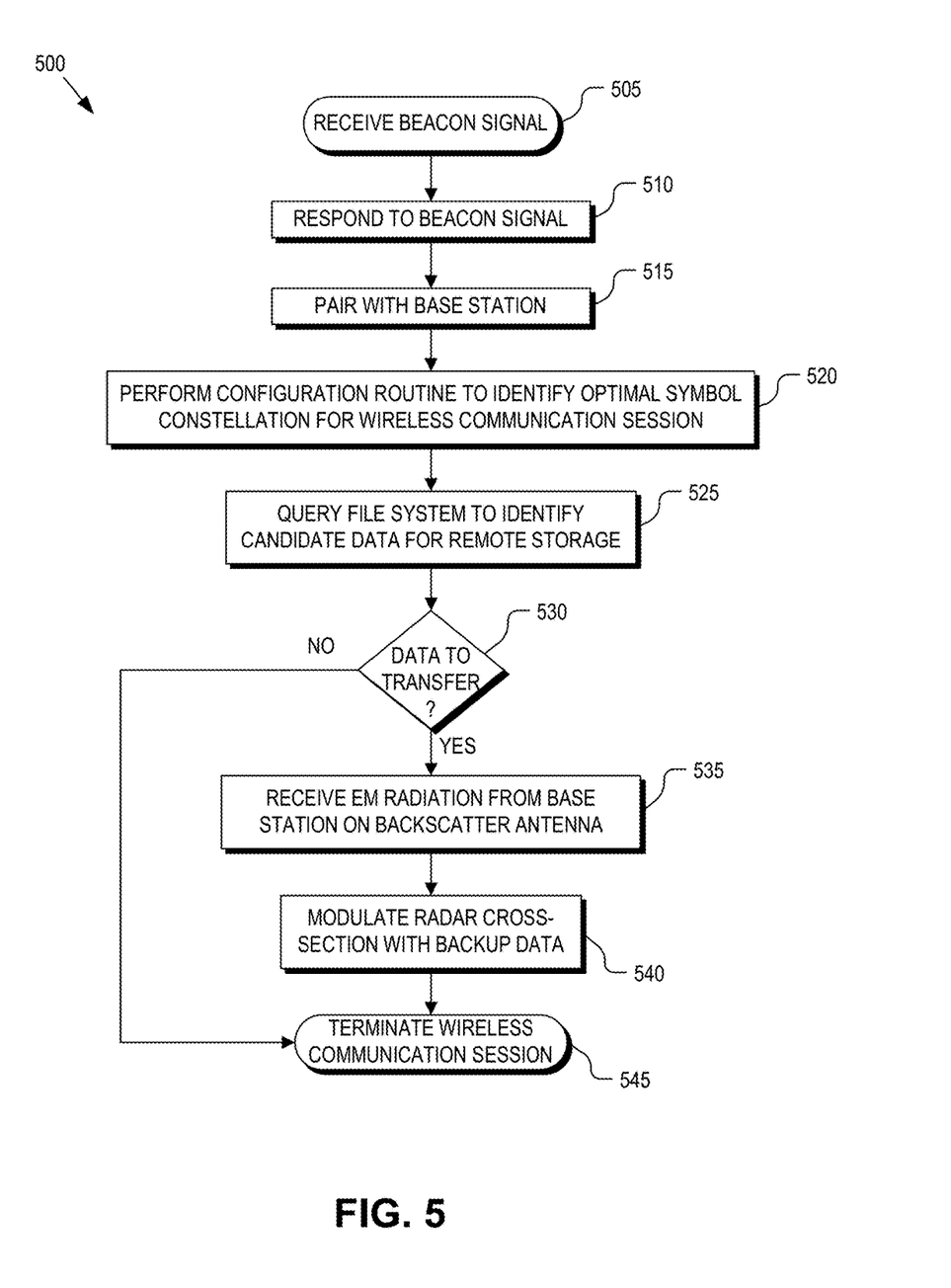
FIG. 5 is a flow chart illustrating mobile side processing for remotely storing data over a backscatter channel, in accordance with an embodiment of the disclosure.

FIG. 5 is a flow chart illustrating a process 500 performed by mobile device 400 for remotely storing data via base station 103 over a backscatter channel, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, mobile device 400 receives a beacon signal indicating the presence of a base station 103 in a vicinity of mobile device 400. The beacon signal can be an in-band signal modulated onto EM radiation 104 or out-of-band and received via one of wireless transceivers 440.

In a process block 510, mobile device 510 responds to the beacon signal to indicate to base station 103 that it wishes establish a wireless communication session by pairing with the base station 103. Again, the response can be in-band via modulating the backscatter signal of EM radiation 104, or out-of-band over a side channel.

In a process block 515, mobile device 400 and base station 103 pair to establish a wireless communication session. Establishing a wireless communication session may include one or more of providing address information to base station 103, negotiating privileges with base station 103, negotiating a data rate, establishing a timeshare allocation, exchanging cryptographic keys to prevent eavesdropping, or otherwise.

In a process block 520, a configuration routine may be performed in cooperation with base station 103 to identify an optimal symbol constellation for encoding the backscatter channel during the wireless communication session. This configuration routine may be part of establishing the wireless communication session. For example, mobile device 400 may encode a configuration data set with a series of different symbols while base station 103 analyzes the signal quality associated with the various different symbols. This configuration routine may continue until mobile device 400 is notified by base station 103 that a preferred symbol constellation that maximizes SNR or data throughput has been identified and conveyed to mobile device 400. The identified symbol constellation may then be used for the remainder of the wireless communication session, for a fixed period of time when the configuration routine is automatically re-executed, or until the signal quality drops below a threshold (e.g., threshold bit error rate). Execution of the configuration routine to dynamically select a symbol constellation for encoding data over the backscatter channel is optional. A fixed symbol constellation may also be used.

In a process block 525, version control module 448 queries a file system of mobile device 400 to identify candidate data for remote storage. In the illustrated embodiment of process 500, version control module 448 queries the file system after pairing with base station 515. However, in other embodiments, version control module 448 queries the file system on an ongoing basis to maintain a real-time list of candidate data. In this latter embodiment, mobile device 400 may only respond to a beacon signal and pair with base station 103 if it has candidate data to upload over a backscatter channel at a given time. In other embodiments, pairing and remote storage are triggered by direct user request/approval, as opposed to a transparent and automated function as described above in various embodiments.

Assuming mobile device 400 has candidate data available for remote storage (decision block 530), then mobile device uses the continuous stream of EM radiation 104 received from base station 103 (process block 535) to transmitting data over the backscatter channel. In process block 540, backscatter tag 405 modulates the radar cross-section of antenna 445 to encode the candidate data onto the backscatter channel. In one embodiment, the radar cross-section of the mobile device 400 is modulated (thereby modulating the radar signature received at the base station) by modulating the impedance load on the selected backscatter antenna using the candidate data. Once the candidate data has been transmitted, the wireless communication session is terminated in a process block 545. Control signaling for terminating the wireless communication session may be executed out-of-band over side channels (e.g., Bluetooth or WiFi), or using a special in-band termination sequence that is recognized by base station 103.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A method of remotely storing data over a wireless communication channel, the method comprising:
    querying a file system of a mobile device to identify candidate data stored on the mobile device for remote storage;
    wirelessly pairing with a base station;

receiving electromagnetic ("EM") radiation incident upon the mobile device from the base station;

performing a configuration routine to adaptively identify a subset of available impedances that improves a signal-to-noise ratio ("SNR") of a backscatter channel within an environment including the mobile device and the base station and increases a throughput between the mobile device and the base station;

using the identified subset of available impedances as a symbol constellation for encoding the candidate data on the backscatter channel at the throughput increased by the configuration routine;

modulating a radar cross-section of the mobile device between two or more states;

encoding the candidate data onto the backscatter channel of the EM radiation via the modulation of the radar cross-section; and transmitting the candidate data to the base station over the backscatter channel for remote storage, wherein wirelessly pairing with the base station comprises establishing the wireless communication session between the mobile device and the base station for data communications over the backscatter channel.

2. The method of claim 1, further comprising:

receiving a beacon signal at the client device received from the base station indicating a presence of the base station in a vicinity of the mobile device; and wirelessly pairing with the base station over the backscatter channel in response to receiving the beacon signal.

3. The method of claim 2, wherein the beacon signal is encoded on the EM radiation of the backscatter channel received at the mobile device.

4. The method of claim 2, wherein the beacon signal is encoded on a wireless side channel distinct from the EM radiation of the backscatter channel.

5. The method of claim 2, wherein querying the file system of the mobile device to identify the candidate data is automatically performed after receiving the beacon signal.

6. The method of claim 1, wherein the remote storage comprises a cloud-based storage service.

7. The method of claim 1, wherein modulating the radar cross-section of the mobile device between two or more states comprises modulating a load impedance of an antenna of the mobile device between the two or more states.

8. The method of claim 1, wherein the mobile device comprises at least one of a mobile phone, a head wearable display, a wrist watch, a body-mountable device, a tablet, a body implantable device, a laptop, a non-volatile memory device, a hard-disk drive, or a camera.

9. The method of claim 1, further comprising:

powering the modulation of the radar cross-section of the mobile device using a primary battery of the mobile device without harvesting power from the EM radiation to charge the primary battery.

10. The method of claim 1, further comprising:

transmitting control signals, which manage transfer of the candidate data during a wireless communication session, from the mobile device to the base station over a wireless side channel with a transceiver that does not use backscatter communications while the candidate data is transferred over the backscatter channel.

11. At least one tangible non-transitory machine-accessible storage medium that provides instructions that, when executed by a mobile device, will cause the mobile device to perform operations comprising:

wirelessly pairing with a base station;

querying a file system of the mobile device to identify candidate data stored on the mobile device for remote storage;

receiving electromagnetic ("EM") radiation incident upon the mobile device from the base station;

modulating a radar cross-section of the mobile device between two or more states;

performing a configuration routine to adaptively identify a subset of available impedances that improves a signal-to-noise ratio ("SNR") of a backscatter channel within an environment including the mobile device and the base station and increases a throughput between the mobile device and the base station;

using the identified subset of available impedances as a symbol constellation for encoding the candidate data on the backscatter channel at the throughput increased by the configuration routine;

encoding the candidate data onto the backscatter channel of the EM radiation via the modulation of the radar cross-section; and transmitting the candidate data to the base station over the backscatter channel for remote storage, wherein wirelessly pairing with the base station comprises establishing the wireless communication session between the mobile device and the base station for data communications over the backscatter channel.

12. The at least one tangible non-transitory machine-accessible storage medium of claim 11, further providing instructions that, when executed by the mobile device, will cause the mobile device to perform further operations, comprising:

receiving a beacon signal at the client device received from the base station indicating a presence of the base station in a vicinity of the mobile device; and wirelessly pairing with the base station over the backscatter channel in response to receiving the beacon signal, wherein the beacon signal is encoded on the EM radiation of the backscatter channel received at the mobile device.

13. The at least one tangible non-transitory machine-accessible storage medium of claim 12, wherein querying the file system of the mobile device to identify the candidate data is automatically performed after receiving the beacon signal.

14. The at least one tangible non-transitory machine-accessible storage medium of claim 11, wherein modulating the radar cross-section of the mobile device between two or more states comprises modulating a load impedance of an antenna of the mobile device between the two or more states.

15. A base station, comprising:

backscatter transceiver circuitry coupled to output electromagnetic ("EM") radiation and to receive a backscatter signal of the EM radiation;

control circuitry coupled to the backscatter transceiver circuitry, the control circuitry including logic, that, when executed by the control circuitry, will cause the base station to perform operations, comprising:

pairing with a mobile device to receive data stored on the mobile device;

outputting the EM radiation towards the mobile device to obtain a radar signature of the mobile device;

receiving the radar signature of the mobile device as a backscatter signal of the EM radiation;

performing a configuration routine to adaptively identify a subset of available impedances that improves a signal-to-noise ratio ("SNR") of the backscatter signal within an environment including the mobile device and the base station and increases a throughput between the mobile device and the base station;

decoding a modulation of the radar signature to extract the data encoded on the backscatter signal, wherein the data is received at the throughput increased by the configuration routine and encoded using the identified subset of available impedances as a symbol constellation; and transmitting the data to a remote location over a network for remote storage of the data.

16. The base station of claim 15, wherein the control circuitry includes further logic, that, when executed by the control circuitry, will cause the base station to perform further operations, comprising:

output a beacon signal encoded on the EM radiation to indicate a presence of the base station to the mobile device that passes into a vicinity surrounding the base station; and pairing with the mobile device in response to receiving a reply to the beacon signal from the mobile device over the backscatter signal.

17. The base station of claim 15, wherein transmitting the data to the remote location comprises automatically transmitting the data to a cloud-based storage service.

18. The base station of claim 15, wherein the control circuitry includes further logic, that, when executed by the control circuitry, will cause the base station to perform further operations, comprising:

sending and receiving control signals to or from the mobile device over one or more side channels distinct from the EM radiation of the backscatter signal to manage transfer of the data over the backscatter signal.

* * * * *